(12) United States Patent
Szabo et al.

(10) Patent No.: US 11,059,517 B2
(45) Date of Patent: Jul. 13, 2021

(54) DRIVING ASSISTANCE METHOD, DRIVING ASSISTANCE SYSTEM AND VEHICLE

(71) Applicant: Robert Bosch GmbH, Stuttgart (DE)

(72) Inventors: Vilmos Szabo, Budapest (HU); Laszlo Anka, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 239 days.

(21) Appl. No.: 16/317,700

(22) PCT Filed: May 23, 2017

(86) PCT No.: PCT/EP2017/062461
§ 371 (c)(1),
(2) Date: Jan. 14, 2019

(87) PCT Pub. No.: WO2018/015050
PCT Pub. Date: Jan. 25, 2018

(65) Prior Publication Data
US 2019/0217889 A1   Jul. 18, 2019

(30) Foreign Application Priority Data

Jul. 22, 2016   (DE) .......................... 102016213495.7

(51) Int. Cl.
*B62D 15/02* (2006.01)
*G06T 7/73* (2017.01)
(Continued)

(52) U.S. Cl.
CPC ............. *B62D 15/025* (2013.01); *B62D 1/02* (2013.01); *B62D 15/0285* (2013.01);
(Continued)

(58) Field of Classification Search
CPC .... B62D 15/025; B62D 1/02; B62D 15/0285; G06T 7/73; G06T 2207/20081;
(Continued)

(56) References Cited

U.S. PATENT DOCUMENTS

2014/0253722 A1* 9/2014 Smyth ................ H04N 5/23296
                                                            348/135
2016/0223350 A1* 8/2016 Lewis .................. G05D 1/0278
(Continued)

FOREIGN PATENT DOCUMENTS

DE      102008002598 A1    1/2009
DE      102015007678 A1    2/2016
DE      102015010746 A1    3/2016

OTHER PUBLICATIONS

International Search Report for PCT/EP2017/062461, dated July 18, 2017.

*Primary Examiner* — Peter D Nolan
*Assistant Examiner* — Wae L Louie
(74) *Attorney, Agent, or Firm* — Norton Rose Fulbright US LLP; Gerard Messina (57) ABSTRACT

A driving assistance method for a vehicle, in which in a training phase, the vehicle is steered by a driver through a setpoint course to a setpoint destination position, and setpoint course data are gathered in the process, in a replay phase, the vehicle is steered automatically through an actual course, actual course data are gathered in the process and, via a comparison of actual course data to setpoint course data, the steering of the vehicle is carried out so that the actual course is adapted/being adapted to the setpoint course and ends in an area of the setpoint destination position; and images of the vehicle surroundings are recorded with a camera as setpoint course data at setpoint positions, spaced equidistantly on a setpoint driving route of the setpoint course, and edge segments, feature points and corresponding descriptors are determined from an image processing for each image.

10 Claims, 7 Drawing Sheets

(51) Int. Cl.
*B62D 1/02* (2006.01)
*G06K 9/00* (2006.01)

(52) U.S. Cl.
CPC ............ *G06K 9/00791* (2013.01); *G06T 7/73* (2017.01); *G06T 2207/20081* (2013.01); *G06T 2207/30241* (2013.01); *G06T 2207/30252* (2013.01)

(58) Field of Classification Search
CPC  G06T 2207/30241; G06T 2207/30252; G06K 9/00791
See application file for complete search history.

(56) References Cited

U.S. PATENT DOCUMENTS

| | | | |
|---|---|---|---|
| 2016/0350603 A1* | 12/2016 | Suddamalla | G06K 9/4604 |
| 2016/0364621 A1* | 12/2016 | Hill | G06T 7/70 |
| 2017/0135621 A1* | 5/2017 | Lee | A61B 3/10 |
| 2017/0329331 A1* | 11/2017 | Gao | B60W 30/10 |
| 2018/0024562 A1* | 1/2018 | Bellaiche | G06T 7/73 |
| | | | 701/26 |
| 2018/0288182 A1* | 10/2018 | Tong | B60R 1/00 |
| 2019/0080482 A1* | 3/2019 | Szabo | G06K 9/6212 |
| 2019/0141070 A1* | 5/2019 | Tsurumi | H04L 63/1425 |
| 2019/0217889 A1* | 7/2019 | Szabo | G06T 7/73 |
| 2019/0220011 A1* | 7/2019 | Della Penna | G08G 1/0133 |
| 2019/0220744 A1* | 7/2019 | Yao | G06N 3/08 |
| 2019/0227568 A1* | 7/2019 | Altinger | B62D 15/0285 |
| 2019/0294966 A1* | 9/2019 | Khan | G06K 9/6267 |
| 2019/0311612 A1* | 10/2019 | Johnson | G08G 1/0112 |
| 2019/0376809 A1* | 12/2019 | Hanniel | G06F 16/29 |
| 2020/0189581 A1* | 6/2020 | Yang | B60W 50/14 |

\* cited by examiner

DRIVING ASSISTANCE METHOD, DRIVING ASSISTANCE SYSTEM AND VEHICLE

FIELD OF THE INVENTION

The present invention relates to a driving assistance method, to a driving assistance system and to a vehicle. The present invention relates, in particular, to a driving assistance method for a vehicle, to a driving assistance system for a vehicle, and in particular a motor vehicle including a driving assistance system.

BACKGROUND INFORMATION

Certain driving assistance systems are increasingly used to assist in the driving of a vehicle. This may be done, for example, with the intention to execute autonomous driving, for example on an expressway or the like, or to assist the vehicle driver during maneuvering and, in particular, during parking.

Conventional driving assistance systems use comparatively complex methods to detect a three-dimensional structure from a sequence of two-dimensional images generated with the aid of a vehicle camera in cooperation with movement data, and therefrom, the location and the orientation of the vehicle in the space and in relation to the surroundings (structure from motion concept).

The disadvantage with these conventional methods is the comparatively high complexity of the data processing for evaluating the location and orientation of the vehicle in the space and in relation to the surroundings. Moreover, known methods are prone to errors with respect to their accuracy of the evaluation of the geometry of the surroundings.

SUMMARY OF THE INVENTION

The driving assistance method according to the present invention having the features of independent claim 1 has the advantage over the related art that a particularly reliable evaluation of the location and orientation of a vehicle in the surroundings is possible using a comparatively simple arrangement. According to the present invention, this is achieved by the features described herein in that a driving assistance method for a vehicle is created in which: (A) in a learning or training phase, the vehicle is steered by a driver through a setpoint course to a setpoint destination position and setpoint course data are gathered in the process; (B) in an application or replay phase, the vehicle is steered automatically through an actual course, actual course data are gathered in the process and, via a comparison of actual course data to setpoint course data, the steering of the vehicle is carried out in such a way that the actual course is adapted or is being adapted to the setpoint course and ends in an area of the setpoint destination position; and (C) images of the surroundings of the vehicle are recorded as setpoint course data in setpoint positions—spaced equidistantly on a setpoint driving route of the setpoint course—and edge segments, feature points and corresponding descriptors are determined from an image processing for each image. By recording camera images of the surroundings of the vehicle in equidistantly spaced positions of the setpoint driving route, i.e., along the covered arc length, and by determining line or edge segments and feature points including corresponding descriptors, the data volume to be processed is reduced compared to conventional procedures, a high degree of reliability in the comparison between actual course data and setpoint course data being achieved from the edge segments, the feature points and the corresponding descriptors.

The further descriptions herein show further refinements of the present invention.

In one specific embodiment of the driving assistance method according to the present invention, it is provided that, during the replay phase, images of the surroundings of the vehicle are recorded with the aid of a camera as actual course data in actual positions—spaced equidistantly on a driving route of the actual course—and edge segments, feature points and corresponding descriptors are determined from an image processing for each image.

A particularly high degree of agreement between the actual course and the setpoint course arises when, according to another refinement of the driving assistance method according to the present invention, a point correspondence is ascertained during the replay phase by (a) comparing the descriptor ascertained for an—in particular instantaneous—actual position to descriptors regarding setpoint positions, and (b) determining the data set of a setpoint position as the reference data set in which there is a maximum descriptor agreement with the descriptor of the actual position, in particular in order to thereby at least approximately determine the instantaneous position of the vehicle relative to the setpoint course.

The evaluation of the gathered data regarding the actual course may be made particularly compact when, according to another refinement of the driving assistance method according to the present invention, an optical flux Y in the form of a vector field is ascertained during the application or replay phase from the data set regarding an—in particular instantaneous—actual position and a reference data set of the setpoint course data.

It is particularly advantageous when optical flux Y is appropriately broken down as a vector field. According to another refinement of the driving assistance method according to the present invention, it may be provided that optical flux r is broken down into a translatory component and a rotatory component in order to determine an instantaneous orientation of the vehicle or its camera on the actual course.

In another alternative of the driving assistance method according to the present invention, it is provided that a relative orientation is ascertained during the application or replay phase based on the respective edge segments from the data set regarding the actual position and the reference data set of the setpoint course data.

The accuracy in the evaluation of the position and location in the space required for assisting the driver of a vehicle may be further enhanced if, according to another advantageous specific embodiment of the driving assistance method according to the present invention, a relative orientation is ascertained during the application or replay phase by (a) projecting edge segments from the data set regarding the actual position and the reference data set of the setpoint course data onto a unit sphere, (b) determining vanishing points and/or (c) comparing the vanishing points.

Particularly simple conditions arise when, as an alternative or in addition, the relative location and orientation in the instantaneous actual position in relation to the setpoint course are ascertained during the application or replay phase, with a known or certain relative orientation, by triangulating the actual position with two—in particular next—positions on the setpoint course, in particular using an orientation in the actual position with respect to the two positions on the setpoint course.

The present invention furthermore relates to a driving assistance system for a vehicle, which is configured to carry out a driving assistance method according to the present invention or to be used in connection with a driving assistance method according to the present invention.

According to one further aspect of the present invention, a vehicle, and in particular a motor vehicle, which may be a passenger car, are also created. The vehicle according to the present invention is configured with a drive, a steering unit, a control unit and a driving assistance system according to the present invention.

The control unit in the vehicle according to the present invention is configured to control the drive and/or the steering unit based on data provided by the driving assistance system according to the present invention.

With reference to the accompanying figures, specific embodiments of the present invention are described in greater detail.

DETAILED DESCRIPTION

With reference to FIGS. 1 through 14, exemplary embodiments of the present invention are described hereafter in greater detail. Identical and equivalent as well as identically or equivalently acting elements and components are denoted by the same reference numerals. The detailed description of the denoted elements and components is not provided each time they occur.

The shown features and further properties may be arbitrarily separated from one another and arbitrarily combined with one another, without departing from the core of the present invention.

Figure 1:
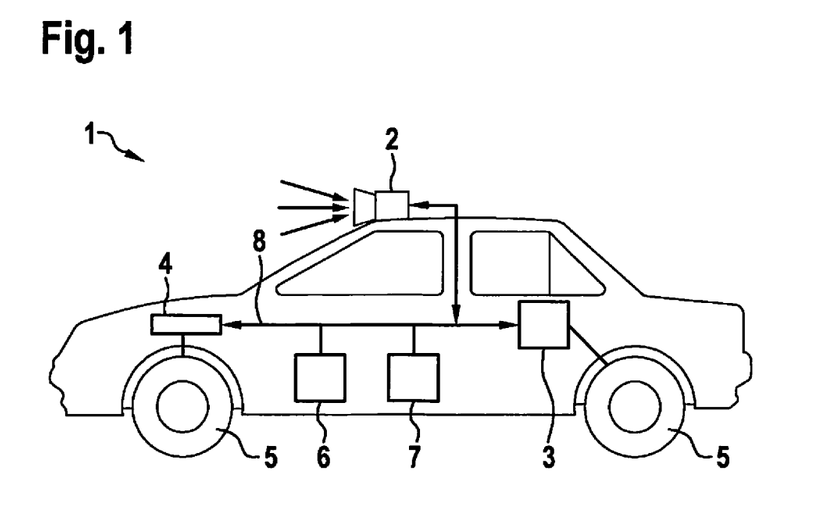
FIG. 1 shows a schematic side view of one specific embodiment of the vehicle according to the present invention.

FIG. 1 shows a schematic side view of one specific embodiment of vehicle 1 according to the present invention.

The vehicle according to the present invention according to FIG. 1 is equipped with a drive 3 for driving a wheel 5. This is a rear wheel 5. Furthermore, vehicle 1 according to the present invention is configured with a steering unit 4 for steering a front wheel 5. Steering unit 4 usually includes a steering wheel to be actuated by a vehicle driver. Additionally, appropriate actuators, for example within the meaning of a power steering system, may be provided.

In connection with aspects of autonomous driving and/or parking, according to the present invention a driving assistance system 7 is configured in cooperation with an outside camera 2 and a general control unit 6 of vehicle 1.

Controlled by control unit 6, camera 2 records the vehicle surroundings in the driving direction of vehicle 1 and, via shared bus 8, outputs corresponding image data, which may be received by driving assistance system 7.

Figure 2:
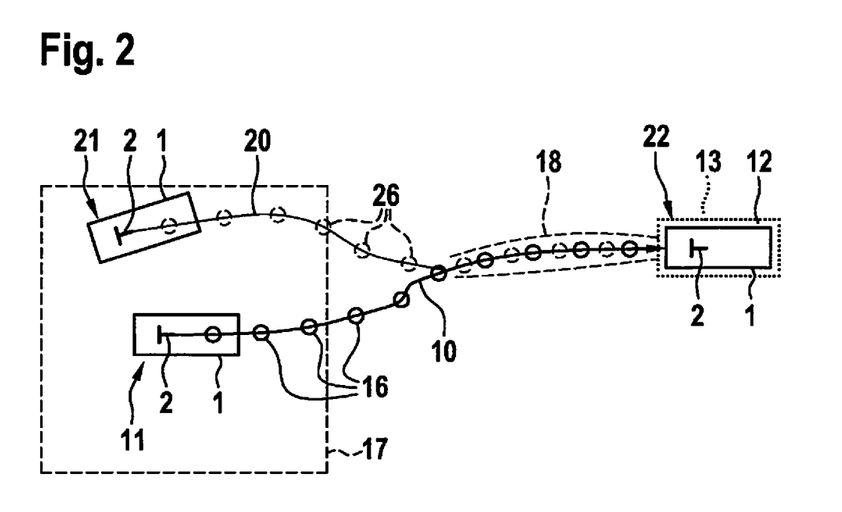
FIG. 2, in a schematic top view, shows a setpoint course compared to an actual course to explain one specific embodiment of the driving assistance method according to the present invention.

Driving assistance system 7 evaluates the image data provided by camera 2, in particular in connection with a comparison between an actual course 20 and a setpoint course 10, as they are explained hereafter in detail in connection with FIG. 2.

Based on the evaluation by driving assistance system 7, control unit 6 is able to control drive 3 and/or steering unit 4 for an autonomous operation of vehicle 1.

FIG. 2, in a schematic top view, explains aspects of one specific embodiment of the driving assistance method according to the present invention.

Shown is a setpoint course 10, which may also be referred to as a training course. It leads from a setpoint starting position 11 to a setpoint destination position 12, which is situated in certain surroundings 13. A multitude of intermediate positions spaced equidistantly along the arc length of setpoint course 10 are provided between setpoint starting position 11 and setpoint destination position 12, which are also referred to as setpoint positions 16 and in which camera 2 of vehicle 1 records an appropriate image of the vehicle surroundings in the driving direction during operation of the training phase.

In the application phase, which is also referred to as the replay phase, vehicle 1 is generally not situated directly in actual starting position 21, but in predefined surroundings 17 thereto. This means that—when actual starting position 21 of vehicle 1 is situated within surroundings 17 of setpoint starting position 11—the driving assistance method according to the present invention may be started to effectuate autonomous driving of vehicle 1 from actual starting position 21 to an actual destination position 22 within area 13 or surroundings 13 of setpoint destination position 12.

On the path from actual starting position 21 into area 13 or surroundings 13 of setpoint destination position 12, vehicle 1 drives along actual course 20, appropriate image data within the meaning of key frames being recorded by camera 2 at intermediate positions, which are referred to as actual positions 26 and evaluated by driving assistance system 7. While driving, in the manner according to the present invention, the data recorded at actual positions 26 are thus compared to the data recorded at setpoint positions 16 during the training phase in order to effectuate steering of vehicle 1 toward setpoint destination position 12, or at least into the area or toward surroundings 13 of setpoint destination position 12.

During this steering, a maximum error, defined by tube 18, between actual course 20 and setpoint course 10 is allowed. This maximum error 18 may be variably configured as a function of the distance from setpoint destination position 12 or from surroundings 13 of setpoint destination position 12 to be reached.

Figure 3:
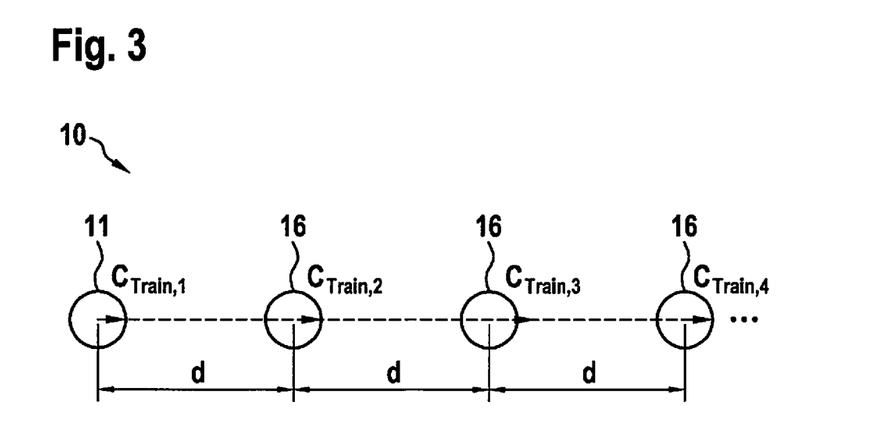
FIG. 3 explains details regarding a setpoint course.

FIG. 3, in a schematic view, shows a section of a setpoint course 10 including a setpoint actual position 11 and setpoint positions 16 spaced apart from one another by an identical distance d. Image data are recorded with the aid of camera 2 of vehicle 1 at all discrete positions 11 and 16 of setpoint course 10. According to the present invention, edge elements, feature points and corresponding descriptors are ascertained in the recorded image data.

For this purpose, camera 2 may be oriented in the direction of the vehicle orientation.

Figure 4:
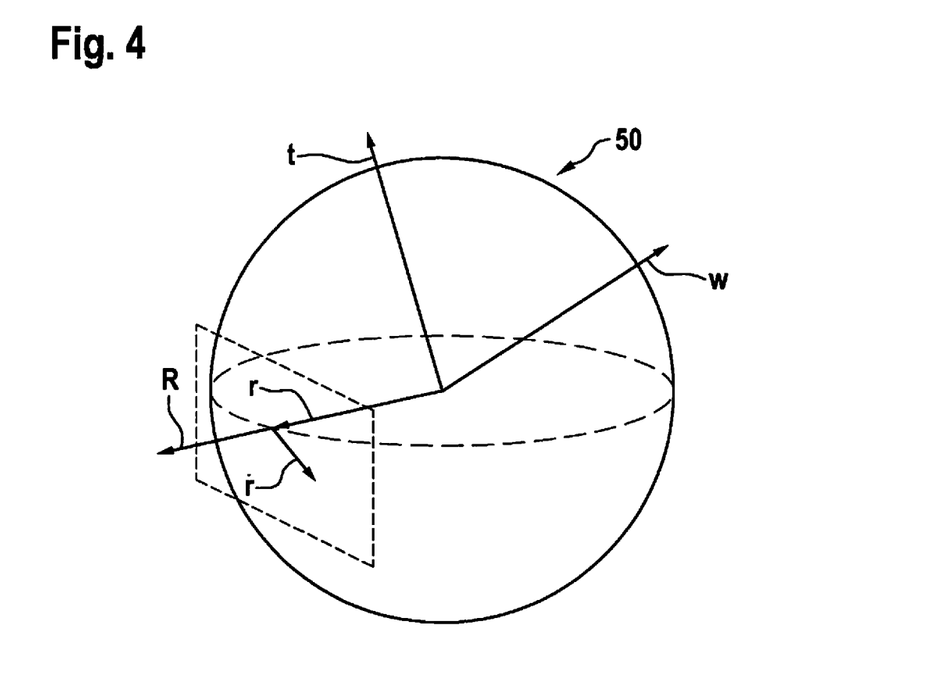
FIG. 4, in schematic form, explains a projection method onto a unit sphere.

FIG. 4, in schematic form, shows the projection onto unit sphere 50, necessary in the method for driving assistance carried out according to the present invention for certain specific embodiments, for ascertaining optical flux and for determining the vanishing points and camera connecting lines 40 or camera base lines 40 between actual positions 26 and setpoint positions 16 and their orientation.

Figure 5:
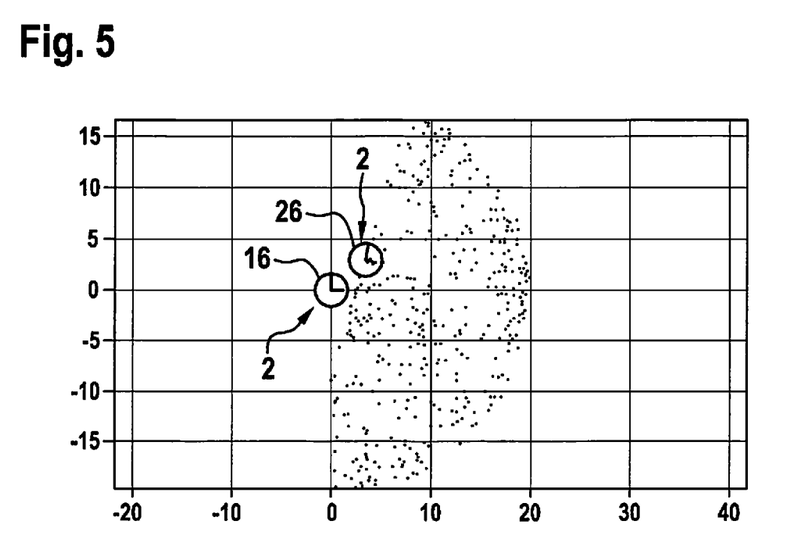
FIGS. 5, 6, 7 and 8, in the form of graphs, show aspects of the optical flux in connection with the determination of the base line orientation of cameras used.
Figure 6:
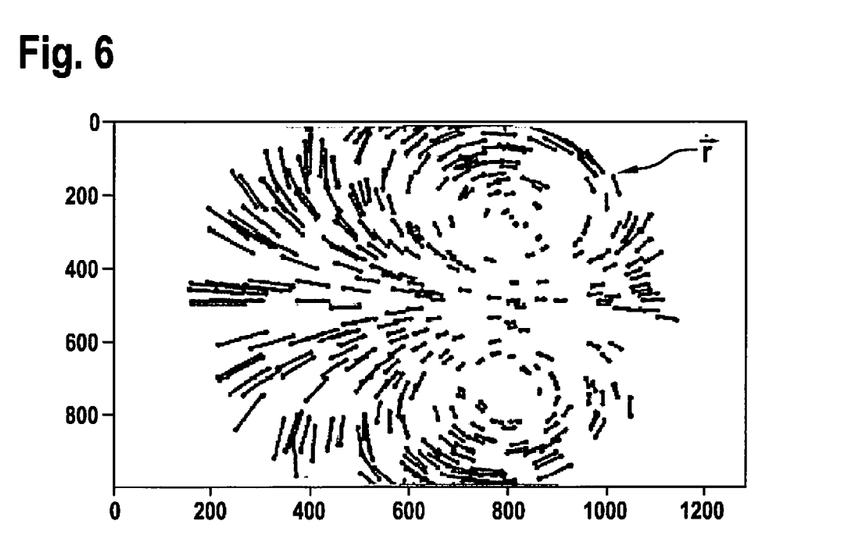
Figure 7:
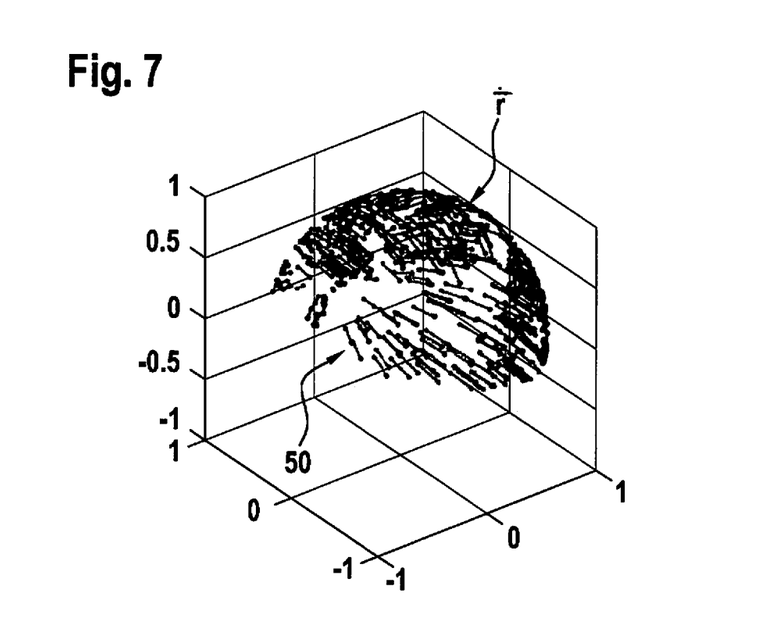
Figure 8:
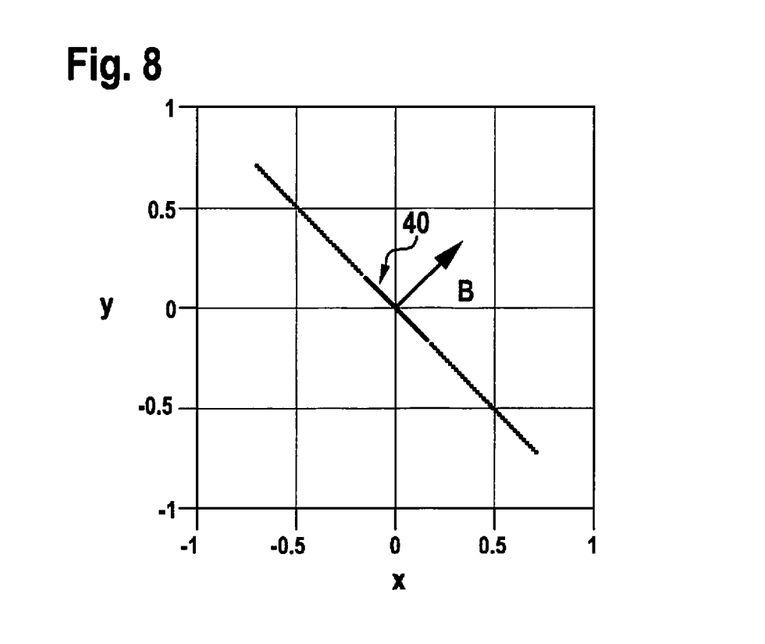

FIGS. 5 through 8, in the form of graphs, show aspects of simulations regarding optical flux, and in particular for two camera positions 16 and 26 according to FIG. 5, optical flux according to FIG. 6 ascertained therefrom, optical flux adjusted for a rotation of camera positions 16 and 26 on unit sphere 50 according to FIG. 4 in FIG. 7, and orientation B of the connecting line between camera positions 16 and 26, ascertained from optical flux on unit sphere 50 according to FIG. 7, in FIG. 8.

Figure 9:
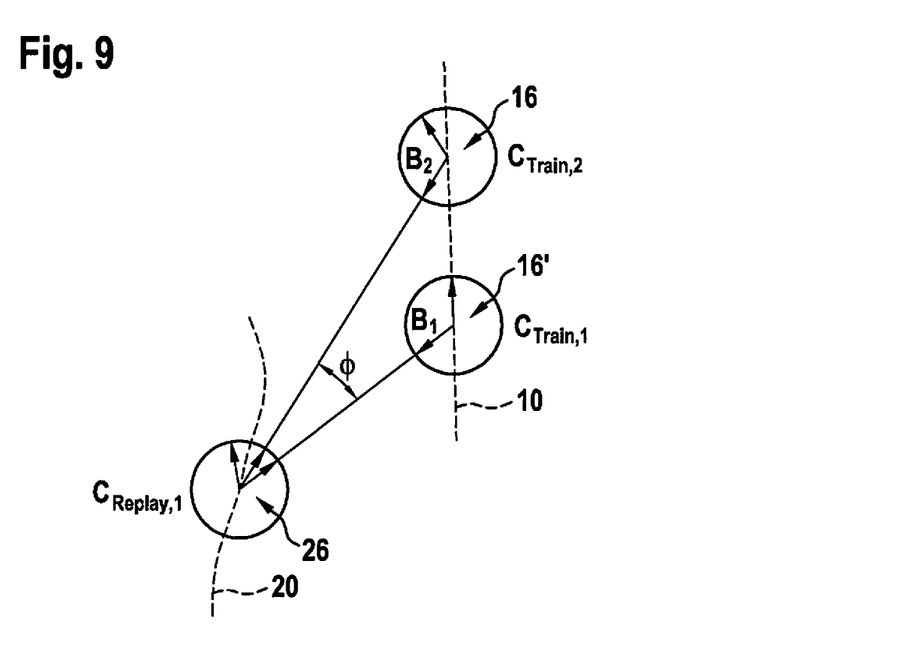
FIG. 9, in schematic form, explains a triangulation method.

FIG. 9, in a schematic top view, shows setpoint course 20 compared to an actual course 10, and aspects of a triangulation of an actual position 26 with a camera orientation compared to setpoint positions 16 and 16' with corresponding camera orientations.

Figure 10:
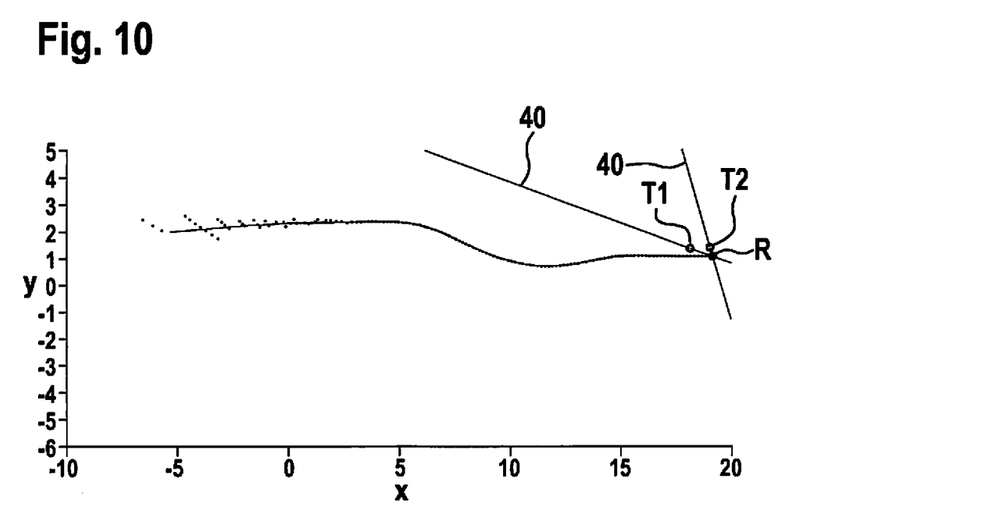
FIGS. 10 and 11, in the form of graphs, show results from simulations and with real data for a triangulation method.
Figure 11:
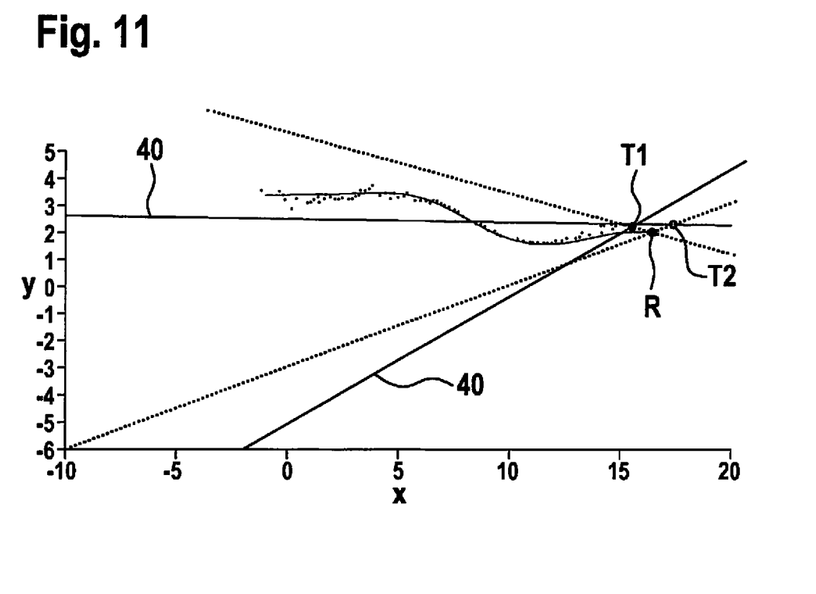

The graphs of FIGS. 10 and 11 describe aspects of the position triangulation based on a simulation or based on real data.

Figure 12:
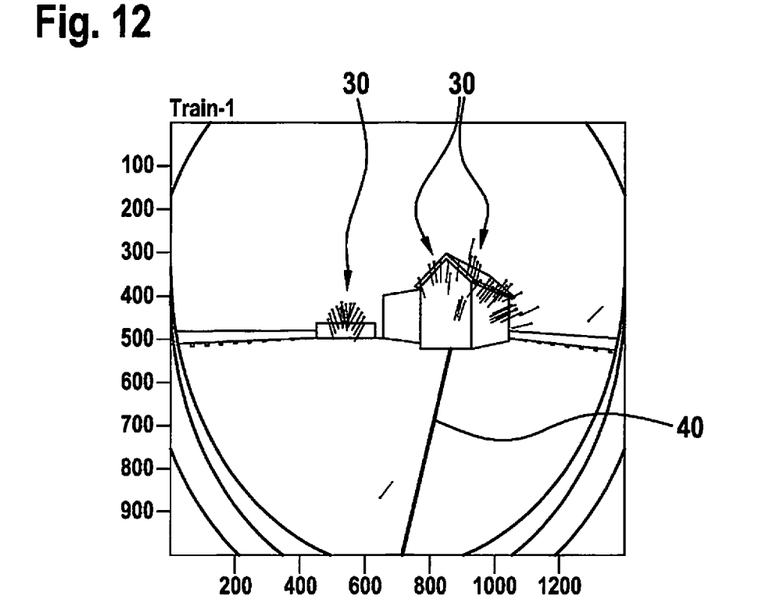
FIGS. 12, 13 and 14, in schematic form, show camera views in connection with a setpoint course and an actual course.
Figure 13:
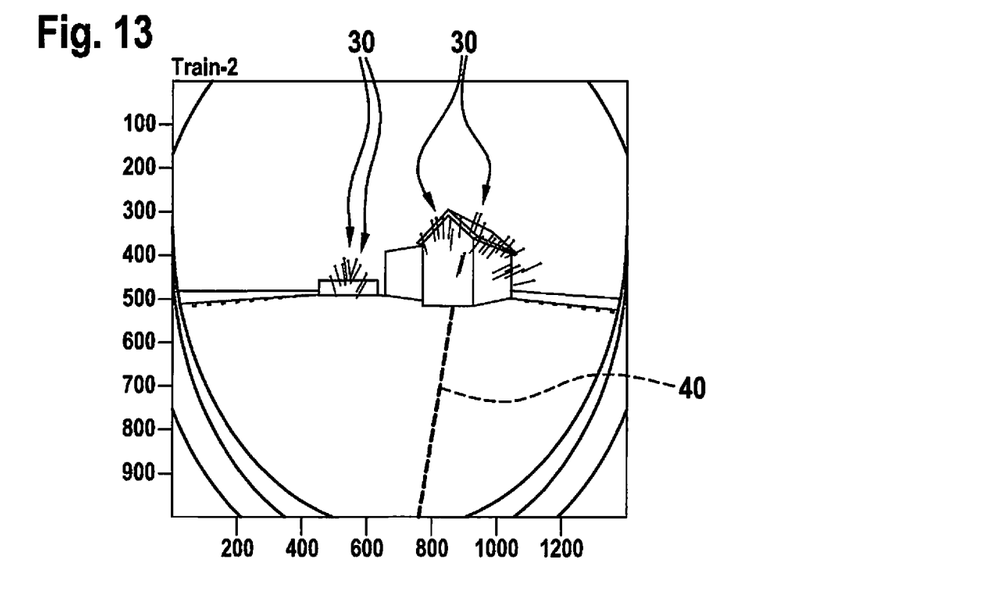
Figure 14:
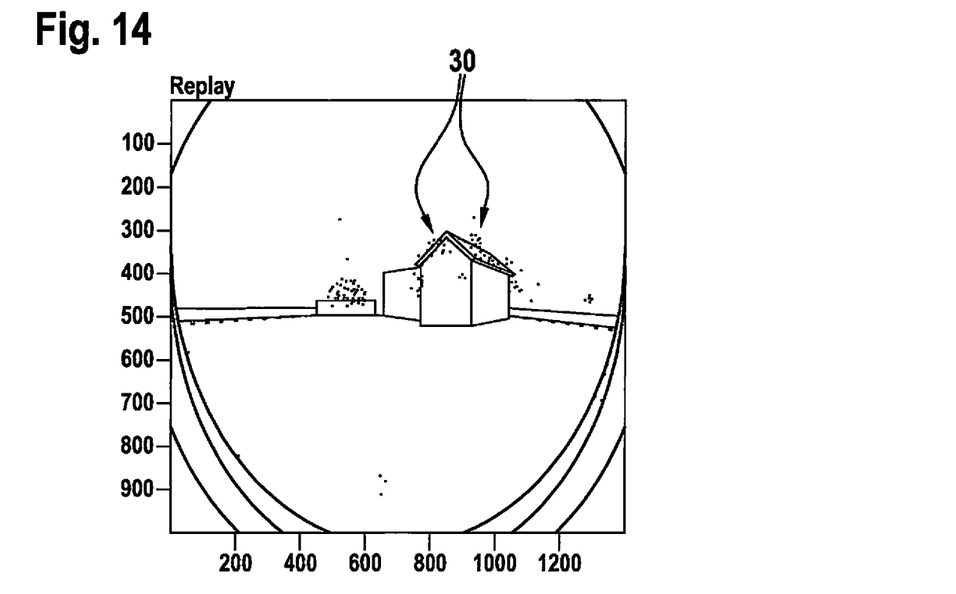

FIGS. 12 through 14, in schematic form, show two-dimensional camera views including correspondingly compared image features 30, which were ascertained via feature points and corresponding descriptors.

Furthermore, FIGS. 12 and 13 show camera base lines 40 between actual position 26 of actual course 20 and two setpoint positions 16 and 16' of setpoint course 10.

These and further features and properties of the present invention are described hereafter based on the following explanations:

For the so-called home zone function, stereo video camera systems are usually used in the case of driving assistance systems 7.

The present invention relates to a driving assistance method and to a corresponding measuring method for determining the relative position and/or orientation or rotation using a near range camera (NRC) system.

The home zone function is a driving assistance component in connection with autonomous driving. The method is made up of two phases, a learning or training phase and an application or replay phase.

During the training phase, aspects of the path and visual impressions of the surroundings are detected and stored while the driver drives vehicle 1 and, for example, drives it to its parking position 12.

During the replay phase, vehicle 1 is then able to autonomously move into parking position 12 or its more immediate surroundings 13 in a similar state.

The training process usually begins in its initial position, which is also referred to as setpoint starting position 11.

In connection with FIG. 2, the boundary or the edge of activation area 17 for the replay phase is defined. Then, vehicle 1 is driven with guidance from the driver to the destination parking position, which is also referred to as setpoint destination position 12, and in particular along training path 10.

The replay phase then begins at the replay starting position, which is also referred to as actual starting position 21 and is situated within activation area 17. Vehicle 1 according to the present invention drives in an autonomous manner on the replay path, which is also referred to as actual course 20. Vehicle 1 approaches training path or setpoint course 10 within tube 18 of the maximally permissible deviation from setpoint course 10 during the approach to setpoint destination position 12.

Surroundings 13 of setpoint destination position 12 describe the maximum error or the maximum deviation which vehicle 1 is permitted to have from setpoint destination position 12 when reaching actual destination position 22 when it is being autonomously steered by driving assistance system 7 according to the present invention.

One problem which is solved by the present invention is to determine the relative position and orientation between a training data set and an application or replay data set. One conventional option for solving this problem offers the so-called structure from motion (SFM) method in that a 3D point cloud is generated along training path 10, and a feature descriptor is generated in connection with each point and saved. During the replay phase, pixels and their descriptors are extracted. A feature comparison takes place, which leads to 3D-2D feature agreements. Solving the so-called perspective three point (P3P) problem provides the relative position and rotation between a training position of the camera and an application or replay position of the camera.

A minimum of four 3D-2D correspondences or agreements are required for this purpose. RANSAC algorithms are used for their determination to filter out outliers and generate an optimal position/orientation parameter.

This conventional procedure is comparatively complex as far as the memory and processing requirement is concerned.

Furthermore, inaccuracies arise since a superimposition of drift and shift effects occurs.

According to the present invention, the following two main aspects, among other things, are improved:

A triangulation of 3D points requires the determination of intersecting points of skew lines or vanishing lines. Remote points are triangulated with the aid of acute angles if the camera base line has a small expansion. These two factors result in inaccuracies with respect to the 3D point cloud.

The generation of the reconstructed surroundings along the training path or actual course 10 requires the inclusion or integration of the vehicle odometry or path length measurement. This results in the inclusion of drift errors which build up over time. One option to reduce the influence of drift effects is to carry out a multitude of training phases, using a so-called bundle adjustment to correct the training path or the setpoint course 10. According to the present invention, the procedure is to be simplified in that a single training phase suffices.

The provided method avoids both sources of errors.

Additional advantages arise from the decoupling of the rotation and of the translation of the vector fields introduced during the calculation.

(1) This means, in particular, that the determination of the rotation may be carried out independently from an image depth.

(2) The translation determination reduces the problem during the determination of the direction angle and may be implemented in an efficient manner.

(3) The ascertainment of the initial position and/or orientation is possible without movement, while the SFM method conventionally necessitates a movement during the determination.

In addition, there is the option to use trifocal tensors for the purpose according to the present invention.

For example, the provided method may be used in connection with fisheye cameras having an effective field of vision of 185 degrees.

However, this is not mandatory, and other camera models are conceivable.

The procedure introduced here and the algorithms associated therewith are conceivable in connection with three degrees of freedom, namely $t_x$, $t_y$, $R_{yaw}$.

Generalizations with up to five degrees of freedom are possible.

Training Phase

The procedure according to the present invention begins with the recording of training data, i.e., in particular along the setpoint course 10 shown in FIG. 2.

Training path 10 is subdivided into equidistantly spaced areas having appropriate measuring positions 16 including appropriate data sets, as is shown in connection with FIG. 3. During the training, the following data are collected at various points 11 and 16 spaced equidistantly by distance d along setpoint course 10 and stored:

$C^{Train, p}$ describes camera position $t_{3\times1}$, $R_{3\times3}$—each with translation t and rotation T—of the training data set with the aid of an appropriate image recorded at respective point 11, 16.

In connection with the image recorded at respective point 11, 16, edge segments or line segments are ascertained, using an edge detector or corner detector.

So-called feature points including corresponding descriptors are also ascertained from the respective recorded image.

Application or Replay Phase

The procedure according to the present invention in connection with the replay phase or application phase begins with the selection of a setpoint position 16 as the training point and an actual position 26 as the replay point.

A point correspondence between the training data set and the application data set or replay data set is ascertained, and in particular by a comparison of the respective descriptors associated with the images (descriptor matching). Based on this procedure, a so-called optical flux or an optical flux field is generated as a vector field between the two data sets. It has the following general form of an optical flux equation:

$$\dot{\vec{r}} = \vec{v}_{tr}(\vec{r}) + \vec{v}_{rot}(\vec{r}) = \frac{1}{|R(\vec{r})|} \cdot \left((\vec{t} \cdot \vec{r}) \cdot \vec{r} - \vec{t}\right) - \vec{w} \times \vec{r}.$$

The individual variables have the following meanings:
R is a global point having Cartesian coordinates x, y, z.
r=R/|R(r)| is the sight ray or directional vector to point R.
w=(α, ß, γ) is the rotation vector.

This vector field is broken down into a rotation component $v_{rot}$ and a translation component $v_{tr}$, and in particular with the aid of the optical flux equation. The rotation component $v_{rot}$ and the translation component $v_{tr}$ are vector fields which result on unit sphere 50 in connection with the flux equation, with the aid of the representation of FIG. 4.

Relative Rotation

The relative rotation or orientation between a training data set and an application data set is derived using the line segments generated in connection with the respective recorded images. The line segments are projected onto sphere 50, which in particular is a unit sphere according to FIG. 4. The vanishing line points or vanishing points are determined. A comparison of the vanishing points yields the relative orientation between the cameras in connection with the training data sets (i.e., at a setpoint position 16) and the replay or application data sets (i.e., at an actual position 26).

Camera Base Line Direction

From the previous procedure, the relative rotations or orientations of the cameras in the respective setpoint position 16 or the respective actual position 26 and the training and application data sets associated therewith are known.

The point correspondences from the feature matching are projected onto the unit sphere. The replay points or application points 26 are derotated on the sphere, i.e., the rotation is canceled, compensated for or reversed, and in particular based on the known relative rotation or orientation. The resulting vector field is then a purely translatory vector field. The camera base line direction may be derived from a 2-point correspondence, in particular with the aid of the following relationships $$\dot{r}_1 = v_{tr}(r_1) + v_{rot}(r_1)$$

$$\dot{r}_2 = v_{tr}(r_2) + v_{rot}(r_2)$$

$$\dot{r}_1 - v_{rot}(r_1) = v_{tr}(r_1) = \frac{1}{|R(r_1)|}((t \cdot r_1)r_1 - t)$$

$$\dot{r}_2 - v_{rot}(r_2) = v_{tr}(r_2) = \frac{1}{|R(r_2)|}((t \cdot r_2)r_2 - t)$$

Here, $n_1$ and $n_2$ denote normal vectors on the plane, which is defined by the origin of sphere 50 and the purely translatory component of optical flux vectors on the surface of sphere 50.

The following applies:

$$n_1 = r_1 \times v_{tr}(r_1)$$

$$n_2 = r_2 \times v_{tr}(r_2)$$

$$B = n_1 \times n_2$$

B is the camera base line direction between the two camera points, i.e., in particular the position of camera 2 at the training position, i.e., a setpoint position 16, and the position of camera 2 at the replay position, i.e., an actual position 26.

This is explained in greater detail in connection with the sequence of FIGS. 5 through 8. There, the simulation of the optical flux as a vector field is shown.

FIG. 5 shows the two considered cameras 2 including translation and rotation, i.e., one camera 2 at a training or setpoint position 16 and one camera at a replay position or actual position 26.

FIG. 6 shows optical flux Y generated in relation to the two cameras as a vector field.

FIG. 7 describes optical flux r which is decoupled from the rotation or derotated, and in particular projected onto a unit sphere 50.

FIG. 8 shows the ascertained camera base line direction or orientation B, as it may be derived from optical flux.

Relative Position

Assuming that two camera base line directions $B_1$ and $B_2$ are present, namely between camera 2 at an actual position 26 and a camera at two setpoint positions 16 and 16', for example according to FIG. 9, the relative position of camera 2 at replay position 26 may be triangulated since the relative position and orientation between the respective considered positions 16, 16' and 26 of camera 2 is known.

This results in relative camera positions and/or orientations in global coordinates without drift according to the following equations:

$$C_{Train,p} = \begin{bmatrix} R_{Train,p} & t_{Train,p} \\ 0^T & 1 \end{bmatrix} = \begin{bmatrix} I_{3\times 3} & 0 \\ 0^T & 1 \end{bmatrix}$$

$$C_{Train,p+1} = \begin{bmatrix} R_{Train,p}^{Train,p+1} & t_{Train,p}^{Train,p+1} \\ 0^T & 1 \end{bmatrix}$$

$$C_{Replay,q} = \begin{cases} \begin{bmatrix} R_{Train,p}^{Replay,q} & t_{Train,p}^{Replay,q} \\ 0^T & 1 \end{bmatrix} \\ \begin{bmatrix} R_{Train,q+1}^{Replay,q} & t_{Train,p+1}^{Replay,q} \\ 0^T & 1 \end{bmatrix} \end{cases}$$

The following relationships also apply:

$$t_{Train,p}^{Replay,q} = \lambda_1 \cdot B_1 + t_{Train,p} = \lambda_2 \cdot B_2 + t_{Train,p}^{Train,p+1}$$

$$\lambda_1 \cdot B_1 - \lambda_2 \cdot B_2 = t_{Train,p}^{Train,p+1} - t_{Train,p} = t^{Train,p+1}$$

$$[B_1 \; -B_2]\begin{bmatrix} \lambda_1 \\ \lambda_2 \end{bmatrix} = t^{Train,p+1} \rightarrow \text{solve for } \lambda_1$$

$$t_{Train,p}^{Replay,q} = \lambda \cdot B_1$$

Simulated data were used in FIG. 4 in connection with the procedure according to the present invention, while actual application data were used as a basis in FIG. 5.

FIGS. 10 and 11 each show the position triangulation of the respective underlying data, i.e., a simulation on the one hand in FIG. 10, and real data in FIG. 11, the method according to the present invention being used as a basis.

What is claimed is:

1. A driving assistance method for a vehicle, the method comprising:
    steering, in a training phase, the vehicle by a driver through a setpoint course to a setpoint destination position, wherein setpoint course data are gathered;
    steering, in a replay phase, the vehicle automatically through an actual course, wherein actual course data are gathered, and wherein, via a comparison of actual course data to setpoint course data, the steering of the vehicle is carried out so that the actual course is adapted or is being adapted to the setpoint course and ends in an area of the setpoint destination position;
    recording images of the surroundings of the vehicle with a camera as setpoint course data at setpoint positions, spaced equidistantly on a setpoint driving route of the setpoint course, wherein edge segments, feature points and corresponding descriptors are determined from an image processing for each of the images;
    recording, during the replay phase, images of the surroundings of the vehicle with the camera as actual course data at actual positions, spaced equidistantly on a driving route of the actual course, wherein edge segments, feature points and corresponding descriptors are determined from an image processing for each of the images;
    ascertaining, during the replay phase, a point correspondence by performing the following:
        comparing the descriptor ascertained for an actual position to descriptors regarding setpoint positions; and
        determining a data set of a setpoint position as a reference data set in which there is a maximum descriptor agreement with the descriptor of the actual position; and
    ascertaining, during the replay phase, an optical flux, in the form of a vector field, from the data set regarding the actual position and the reference data set of the setpoint course data.

2. The driving assistance method of claim 1, wherein the optical flux is broken down into a translatory component and a rotatory component to determine an instantaneous orientation of the vehicle and/or its camera on the actual course.

3. The driving assistance method of claim 1, wherein, during the replay phase, a relative orientation is ascertained based on the respective edge segments from the data set regarding the actual position and the reference data set of the setpoint course data.

4. The driving assistance method of claim 1, wherein, during the replay phase, a relative orientation is ascertained by performing the following:
    projecting edge segments from the data set regarding the actual position and the reference data set of the setpoint course data onto a unit sphere;
    determining vanishing points; and
    comparing the vanishing points.

5. The driving assistance method of claim 1, wherein, during the replay phase, the relative location and orientation in the instantaneous actual position in relation to the setpoint course are ascertained, with a known or certain relative orientation, by triangulating the actual position with two positions on the setpoint course.

6. The driving assistance method of claim 1, wherein, during the replay phase, the relative location and orientation in the instantaneous actual position in relation to the setpoint course are ascertained, with a known or certain relative orientation, by triangulating the actual position with two next positions on the setpoint course, by using an orientation at the actual position with respect to the two positions on the setpoint course.

7. A driving assistance system for a vehicle, comprising:
    a driving assistance device configured to perform the following:
        steering, in a training phase, the vehicle by a driver through a setpoint course to a setpoint destination position, wherein setpoint course data are gathered;
        steering, in a replay phase, the vehicle automatically through an actual course, wherein actual course data are gathered, and wherein, via a comparison of actual course data to setpoint course data, the steering of the vehicle is carried out so that the actual course is adapted or is being adapted to the setpoint course and ends in an area of the setpoint destination position;
        recording images of the surroundings of the vehicle with a camera as setpoint course data at setpoint positions, spaced equidistantly on a setpoint driving route of the setpoint course, wherein edge segments, feature points and corresponding descriptors are determined from an image processing for each of the images;
        recording, during the replay phase, images of the surroundings of the vehicle with the camera as actual course data at actual positions, spaced equidistantly on a driving route of the actual course, wherein edge segments, feature points and corresponding descriptors are determined from an image processing for each of the images;
        ascertaining, during the replay phase, a point correspondence by performing the following:
            comparing the descriptor ascertained for an actual position to descriptors regarding setpoint positions; and determining a data set of a setpoint position as a reference data set in which there is a maximum descriptor agreement with the descriptor of the actual position; and ascertaining, during the replay phase, an optical flux, in the form of a vector field, from the data set regarding the actual position and the reference data set of the setpoint course data.

8. A vehicle, comprising:

a drive;

a steering unit;

a control unit; and a driving assistance system configured to perform the following:

steering, in a training phase, the vehicle by a driver through a setpoint course to a setpoint destination position, wherein setpoint course data are gathered;

steering, in a replay phase, the vehicle automatically through an actual course, wherein actual course data are gathered, and wherein, via a comparison of actual course data to setpoint course data, the steering of the vehicle is carried out so that the actual course is adapted or is being adapted to the setpoint course and ends in an area of the setpoint destination position; and recording images of the surroundings of the vehicle with a camera as setpoint course data at setpoint positions, spaced equidistantly on a setpoint driving route of the setpoint course, wherein edge segments, feature points and corresponding descriptors are determined from an image processing for each of the images;

recording, during the replay phase, images of the surroundings of the vehicle with the camera as actual course data at actual positions, spaced equidistantly on a driving route of the actual course, wherein edge segments, feature points and corresponding descriptors are determined from an image processing for each of the images;

ascertaining, during the replay phase, a point correspondence by performing the following:

comparing the descriptor ascertained for an actual position to descriptors regarding setpoint positions; and determining a data set of a setpoint position as a reference data set in which there is a maximum descriptor agreement with the descriptor of the actual position; and ascertaining, during the replay phase, an optical flux, in the form of a vector field, from the data set regarding the actual position and the reference data set of the setpoint course data;

wherein the control unit is configured to control the drive and/or the steering unit based on data provided by the driving assistance system.

9. A driving assistance method for a vehicle, the method comprising:

steering, in a replay phase, the vehicle automatically through an actual course;

recording, during the replay phase, images of the surroundings of the vehicle with a camera as actual course data at actual positions on a driving route of the actual course;

processing the images recorded during the replay phase to determine edge segments, feature points and corresponding descriptors for each of the images;

comparing the descriptor ascertained for an actual position to descriptors regarding setpoint positions of a setpoint course; and determining a correspondence between the actual position and a set of the setpoint positions in which there is a maximum descriptor agreement;

ascertaining an optical flux, in the form of a vector field, based on the actual course data for the actual position and the setpoint course data for the determined correspondence setpoint positions; and steering the vehicle to adapt the actual course to the setpoint course based on the optical flux.

10. The driving assistance method of claim 9, further comprising:

steering, in a training phase, the vehicle by a driver through the setpoint course to a setpoint destination position, wherein setpoint course data are gathered;

recording, during the training phase, images of the surroundings of the vehicle with a camera as setpoint course data at setpoint positions on a setpoint driving route of the setpoint course; and processing the images recorded during the training phase to determine edge segments, feature points and corresponding descriptors for each of the images.

* * * * *